(12) United States Patent
Lee et al.

(10) Patent No.: US 11,055,442 B2
(45) Date of Patent: *Jul. 6, 2021

(54) SECURE DECENTRALIZED SYSTEM UTILIZING SMART CONTRACTS, A BLOCKCHAIN, AND/OR A DISTRIBUTED FILE SYSTEM

(71) Applicant: Capital One Services, LLC, McLean, VA (US)

(72) Inventors: Jonathan Lee, Kitchener (CA); Steve Frensch, Ontario (CA); Ethan Greig, Dundas (CA); Anna-Maria Nalepa, Mississauga (CA); Zheng Jian, Kitchener (CA)

(73) Assignee: Capital One Services, LLC, McLean, VA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/662,306

(22) Filed: Oct. 24, 2019

(65) Prior Publication Data

US 2020/0057870 A1 Feb. 20, 2020

Related U.S. Application Data

(63) Continuation of application No. 16/152,916, filed on Oct. 5, 2018, now Pat. No. 10,496,850, which is a
(Continued)

(51) Int. Cl.
*H04L 9/00* (2006.01)
*G06F 21/64* (2013.01)
(Continued)

(52) U.S. Cl.
CPC .......... *G06F 21/64* (2013.01); *G06F 16/182* (2019.01); *G06Q 40/025* (2013.01);
(Continued)

(58) Field of Classification Search
CPC ......... G06F 21/64; H04L 9/14; H04L 9/3239; H04L 9/0637
See application file for complete search history.

(56) References Cited

U.S. PATENT DOCUMENTS 9,298,806 B1 3/2016 Vessenes et al.
9,715,541 B1 7/2017 Kosslyn et al.
(Continued)

OTHER PUBLICATIONS

Co-pending U.S. Appl. No. 16/152,916, filed Oct. 5, 2018.
(Continued)

*Primary Examiner* — Beemnet W Dada
(74) *Attorney, Agent, or Firm* — Harrity & Harrity, LLP

(57) ABSTRACT

A node associated with an organization may receive a storage identifier for new credit data associated with an individual. A distributed ledger and distributed data sources may be used to share the new credit data with a network of nodes. The node may update a smart contract with the storage identifier for the new credit data. The node may receive, from a particular device associated with the organization, a request for the new credit data. The node may obtain the storage identifier for the new credit data from the smart contract. The node may obtain the new credit data by using the storage identifier to search the distributed data sources. The node may provide the new credit data to the particular device. The node may perform actions to obtain additional new credit data from the distributed data sources or provide the additional new credit data to the distributed data sources.

20 Claims, 12 Drawing Sheets

Related U.S. Application Data continuation of application No. 15/997,271, filed on Jun. 4, 2018, now Pat. No. 10,095,888.

(51) Int. Cl.
  *H04L 9/06* (2006.01)
  *G06Q 40/02* (2012.01)
  *G06F 16/182* (2019.01)
  *H04L 9/32* (2006.01)
  *H04L 9/14* (2006.01)

(52) U.S. Cl.
  CPC .............. *H04L 9/0637* (2013.01); *H04L 9/14* (2013.01); *H04L 9/3239* (2013.01); *H04L 2209/38* (2013.01)

(56) References Cited

U.S. PATENT DOCUMENTS

| | | | |
|---|---|---|---|
| 9,792,648 | B1 | 10/2017 | Haller et al. |
| 9,898,780 | B2 | 2/2018 | Bornhofen et al. |
| 9,922,326 | B2 | 3/2018 | Alexander, IV et al. |
| 10,095,888 | B1 * | 10/2018 | Lee .............. G06F 21/64 |
| 10,496,850 | B1 * | 12/2019 | Lee .............. H04L 9/3239 |
| 2005/0065871 | A1 | 3/2005 | Gerhart et al. |
| 2016/0342976 | A1 | 11/2016 | Davis |
| 2016/0342977 | A1 | 11/2016 | Lam |
| 2018/0034804 | A1 | 2/2018 | Steiner |
| 2018/0075527 | A1 | 3/2018 | Nagla et al. |
| 2019/0102837 | A1 | 4/2019 | Smith et al. |
| 2019/0147431 | A1 | 5/2019 | Galebach et al. |
| 2019/0180274 | A1 | 6/2019 | Johnson |
| 2019/0188657 | A1 | 6/2019 | Arora et al. |
| 2019/0236565 | A1 | 8/2019 | Song et al. |

OTHER PUBLICATIONS

Leimgruber J., et al., "Bloom Protocol," https://bloom.co/whitepaper.pdf, Jan. 27, 2018, 19 pages.

International Search Report and Written Opinion for Application No. PCT/US2019/034913, dated Aug. 21, 2019, 9 pages.

Jacob E., et al., "On or Off the Blockchain? Insights on Off-Chaining Computation and Data", International Conference on Computer Analysis of Images and Patterns (CAIP), Berlin, Sep. 1, 2017, pp. 3-15, XP047446752.

Swan M., "Blockchain Blueprint for a New Economy", Jan. 22, 2015, pp. 19-65, XP055406241, [Retrieved on Sep. 13, 2017] Retrieved from the internet [URL: http://w2.blockchain-tec.net/blockchain/blockchain-by-melanie-swan.pdf].

* cited by examiner

500 ─┐

510

Receive, by a first node associated with a first organization, a storage identifier for new credit data associated with an individual, wherein a distributed ledger and a set of distributed data sources are used to share the new credit data with a network of nodes that are associated with a group of organizations that are permitted to access the new credit data, wherein the storage identifier is used to identify a storage location at which the new credit data is to be stored within the set of distributed data sources, and wherein the new credit data has been provided to the set of distributed data sources by a second node associated with a second organization of the group of organizations

↓ 520

Update a smart contract associated with the individual to include the storage identifier for the new credit data

↓ 530

Receive, from a device associated with the first organization, a request for the new credit data

↓ 540

Obtain the storage identifier for the new credit data from the smart contract, wherein obtaining the storage identifier from the smart contract causes the smart contract to provide digital currency associated with the first organization to an account associated with the second organization

↓ 550

Obtain the new credit data by using the storage identifier to search the set of distributed data sources

↓ 560

Provide the new credit data to the device associated with the first organization

↓ 570

Perform a group of actions associated with obtaining additional new credit data from the set of distributed data sources or providing the additional new credit data to the set of distributed data sources

610
Receive new credit data of an individual that has credit with a first organization, wherein a blockchain and a set of distributed data sources are to be used to share the new credit data with a network of nodes that are associated with a group of organizations that are permitted to access the new credit data

620
Provide a storage identifier for the new credit data to a smart contract associated with the individual, wherein the smart contract is supported by the blockchain, and wherein the storage identifier is used to identify a storage location at which the new credit data is to be stored within the set of distributed data sources

630
Provide the new credit data and the storage identifier to the set of distributed data sources, wherein the new credit data is stored in association with the storage identifier

640
Broadcast the storage identifier for the new credit data to the network of nodes to cause a particular node, of the network of nodes, to add the storage identifier for the new credit data to a copy of the smart contract that is accessible to the particular node, wherein broadcasting the storage identifier permits the particular node to, based on a request for the new credit data by a second organization, obtain the storage identifier for the new credit data from the copy of the smart contract, use the storage identifier to obtain the new credit data from the set of distributed data sources, provide the new credit data to an interface associated with the second organization, and provide digital currency associated with the second organization to an account associated with the first organization

650
Perform a group of actions associated with obtaining additional new credit data from the set of distributed data sources and/or providing the additional new credit data to the set of distributed data sources

FIG. 6

SECURE DECENTRALIZED SYSTEM UTILIZING SMART CONTRACTS, A BLOCKCHAIN, AND/OR A DISTRIBUTED FILE SYSTEM

RELATED APPLICATIONS

This application is a continuation of U.S. patent application Ser. No. 16/152,916, filed on Oct. 5, 2018, which is a continuation of U.S. patent application Ser. No. 15/997,271 filed Jun. 4, 2018 (now U.S. Pat. No. 10,095,888), the contents of which are incorporated herein by reference in their entireties.

BACKGROUND

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but may securely exchange information. Further, the distributed ledger may correspond to a record of consensus with a cryptographic audit trail that is maintained and validated by a set of independent computers.

SUMMARY

According to some possible implementations, a first node may include one or more memories and one or more processors that are communicatively connected to the one or more memories. The one or more processors may receive new credit data of an individual that has credit with a first organization. A distributed ledger and a set of distributed data sources may be used to share the new credit data with a network of nodes that are associated with a group of organizations that are permitted to access the new credit data. The one or more processors may generate a storage identifier for the new credit data by executing a mapping function. The storage identifier may identify a storage location at which the new credit data is to be stored within the set of distributed data sources. The one or more processors may provide the storage identifier for the new credit data to a smart contract associated with the individual. The smart contract may be supported by the distributed ledger. The one or more processors may broadcast the storage identifier for the new credit data to the network of nodes to cause a second node, of the network of nodes, to provide the storage identifier for the new credit data to a copy of the smart contract that is accessible to the second node. Broadcasting the storage identifier may permit the second node, based on a request from a device associated with a second organization, to obtain the new credit data, obtain the storage identifier for the new credit data from the copy of the smart contract, use the storage identifier to obtain the new credit data from the set of distributed data sources, provide the new credit data to the device associated with the second organization, and provide digital currency associated with the second organization to an account associated with the first organization. The one or more processors may perform a group of actions associated with obtaining additional new credit data from the set of distributed data sources or providing the additional new credit data to the set of distributed data sources.

According to some possible implementations, a method may include receiving, by a first node that is associated with a first organization, a storage identifier for new credit data associated with an individual. A distributed ledger and a set of distributed data sources may be used to share the new credit data with a network of nodes that are associated with a group of organizations that are permitted to access the new credit data. The storage identifier may be used to identify a storage location at which the new credit data is to be stored within the set of distributed data sources. The new credit data may be provided to the set of distributed data sources by a second node associated with a second organization of the group of organizations. The method may include updating, by the first node, a smart contract associated with the individual to include the storage identifier for the new credit data. The method may include receiving, by the first node and from a device associated with the first organization, a request for the new credit data. The method may include obtaining, by the first node, the storage identifier for the new credit data from the smart contract. Obtaining the storage identifier from the smart contract may cause the smart contract to provide digital currency associated with the first organization to an account associated with the second organization. The method may include obtaining, by the first node, the new credit data by using the storage identifier to search the set of distributed data sources. The method may include providing, by the first node, the new credit data to the device associated with the first organization. The method may include performing, by the first node, a group of actions associated with obtaining additional new credit data from the set of distributed data sources or providing the additional new credit data to the set of distributed data sources.

According to some possible implementations, a non-transitory computer-readable medium may store one or more instructions that, when executed by one or more processors, cause the one or more processors to receive new credit data of an individual that has credit with a first organization. A blockchain and a set of distributed data sources may be used to share the new credit data with a network of nodes that are associated with a group of organizations that are permitted to access the new credit data. The one or more instructions may cause the one or more processors to provide a storage identifier for the new credit data to a smart contract associated with the individual. The smart contract may be supported by the blockchain. The storage identifier may be used to identify a storage location at which the new credit data is to be stored within the set of distributed data sources. The one or more instructions may cause the one or more processors to provide the new credit data and the storage identifier to the set of distributed data sources. The new credit data may be stored in association with the storage identifier. The one or more instructions may cause the one or more processors to broadcast the storage identifier for the new credit data to the network of nodes to cause a particular node, of the network of nodes, to add the storage identifier for the new credit data to a copy of the smart contract that is accessible to the particular node. Broadcasting the storage identifier may permit the particular node to, based on a request for the new credit data by a second organization, obtain the storage identifier for the new credit data from the copy of the smart contract, use the storage identifier to obtain the new credit data from the set of distributed data sources, provide the new credit data to an interface associated with the second organization, and provide digital currency associated with the second organization to an account associated with the first organization. The one or more instructions may cause the one or more processors to perform a group of actions associated with obtaining additional new credit data from the set of distributed data sources and/or providing the additional new credit data to the set of distributed data sources.

BRIEF DESCRIPTION OF THE DRAWINGS

FIGS. 4-6 are flow charts of an example process for sharing credit data of an individual among a network of nodes that have access to a distributed ledger, a smart contract associated with the individual, and a distributed file system.

DETAILED DESCRIPTION

Figure 1A:
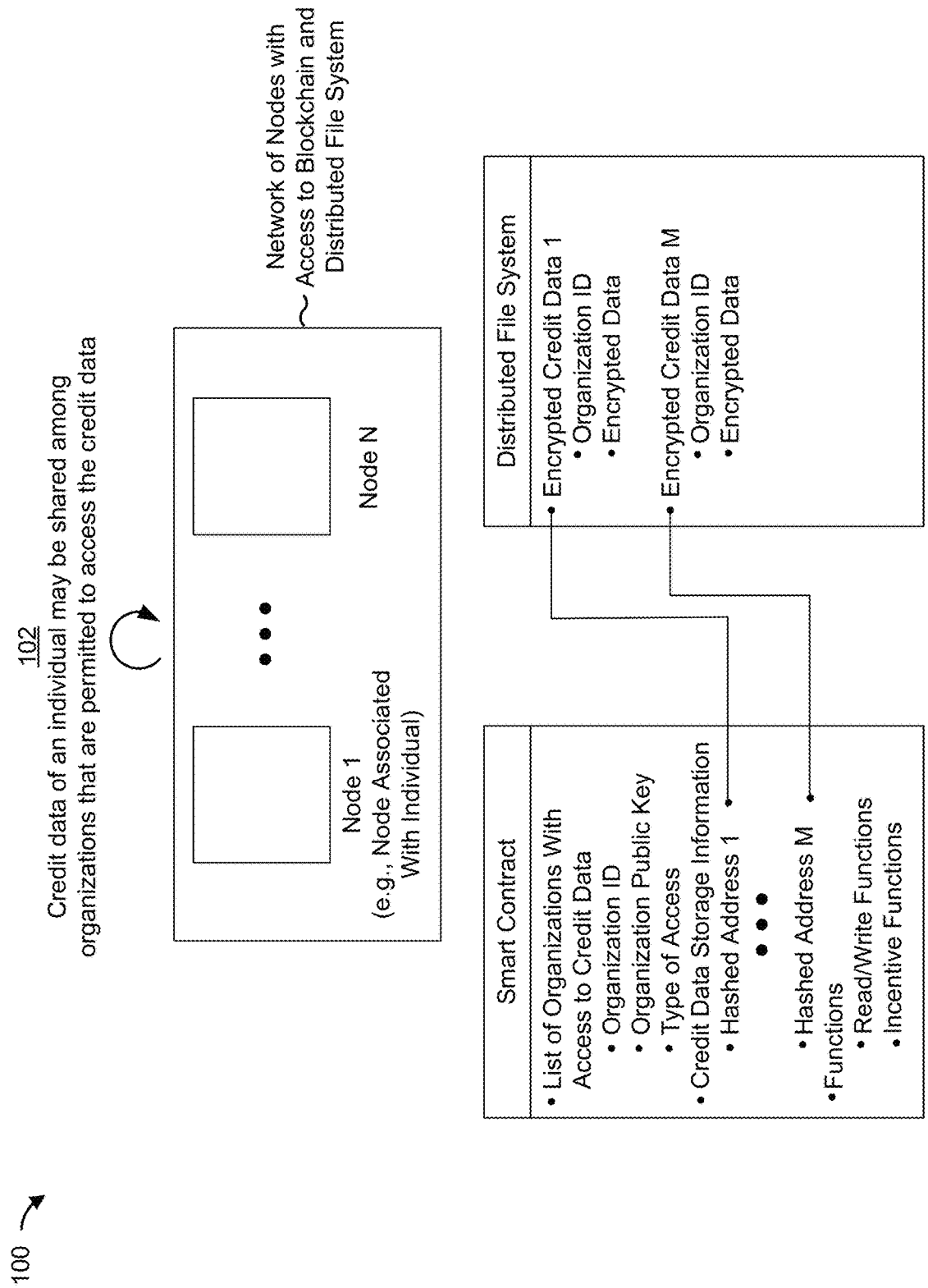
FIGS. 1A-1G are diagrams of an example implementation described herein.

The following detailed description of example implementations refers to the accompanying drawings. The same reference numbers in different drawings may identify the same or similar elements.

A reporting agency may collect data relating to individuals, and a group of organizations may pay the reporting agency to access the data. For example, a credit reporting agency may collect credit data of individuals, and a group of organizations (e.g., financial institutions) may pay the credit reporting agency to access the credit data. In this case, each organization may independently provide the credit data of the individuals to the credit reporting agency, thus allowing the credit reporting agency to serve as a singular source of credit data, and to charge organizations to access the credit data.

However, the credit reporting agency may not provide the organizations with any consideration for initially providing the credit reporting agency with the credit data. Furthermore, providing credit data to credit reporting agencies creates security and/or privacy concerns. For example, a credit reporting agency may resell the credit data of the individual without the knowledge or consent of the individual or the organization providing the credit data of the individual, may have a security breach that allows an unauthorized user to obtain the credit data, and/or the like.

In some cases, a blockchain may be used to store credit data for individuals. A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision.

Additionally, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. Further, the distributed ledger may correspond to a record of consensus with a cryptographic audit trail that is maintained and validated by a set of independent computers.

However, using the blockchain to store credit data of individuals may create scalability issues when large quantities of credit data are considered. Furthermore, without an adequate system for incentivizing organizations to continue to update the blockchain with the credit data of individuals, the blockchain may not be a reliable source of updated credit data of individuals.

Some implementations described herein include a first node, of a network of nodes, that is able to share credit data of an individual by utilizing a distributed ledger supported by a blockchain, a smart contact associated with the individual, a distributed file system. Additionally, some implementations described herein may also provide a mechanism for incentivizing organizations to use the distributed ledger and the distributed file system to share the credit data, as described further herein. In this way, the first node is able to facilitate the distribution of the credit data in a manner that is secure, distributed, automated, and incentive-driven.

For example, security is provided by supporting the distributed ledger with a tamper-resistant data structure (e.g., the blockchain), by implementing various forms of authentication, by restricting access to the network of nodes to particular organizations or parties, and/or the like. To provide a few particular examples, the distributed ledger may improve security by preserving an immutable record of the credit data, by using cryptographic links between blocks of the distributed ledger (e.g., reducing the potential for unauthorized tampering with the credit data), and/or the like. Security is further improved as a result of nodes that have access to the distributed ledger independently verifying each transaction that is added to the distributed ledger. Moreover, use of a distributed ledger also provides failover protection, in that the first node may continue to operate in a situation where one or more other nodes that have access to the distributed ledger fail.

Furthermore, by incentivizing organizations to update the distributed file system with new credit data, the credit data may serve as a reliable indicator of credit worthiness of the individual. Still further, the first node conserves processing resources and/or network resources and/or memory resources. For example, the first node conserves processing resources and/or network resources that might otherwise be used to query a set of credit bureau data sources to obtain credit data of the individual. As another example, by utilizing a distributed file system to store the credit data, the network of nodes improves in scalability, and conserves memory resources that might otherwise be used to attempt to store the credit data on the blockchain.

FIGS. 1A-1G are diagrams of an example implementation 100 described herein. For example, example implementation 100 may include a network of nodes that are associated with a group of organizations that share credit data of an individual using a distributed ledger supported by a blockchain, a smart contract specific to the individual, a distributed file system. Additionally, in some cases, the network of nodes may implement a mechanism for incentivizing the group of organizations to use the distributed ledger and the distributed file system to share credit data.

As shown in FIG. 1A, and by reference number 102, the credit data of the individual may be shared among the group of organizations that are permitted to access the credit data. The individual may have a credit history with the group of organizations and/or may request credit from the group of organizations. The group of organizations may include financial institutions, lending institutions, organizations with data that may be useful for determining a credit score (e.g., organizations that rate the individual, such as organizations that provide online-purchasing platforms, ride sharing organizations, etc.), and/or the like. In some cases, the group of organizations may be limited to lending organizations, may exclude credit reporting agencies, and/or the like.

The credit data may include credit events data (e.g., data indicating whether a payment was made, whether a payment was timely, etc.), credit scoring data (e.g., a credit score determined by a particular organization), data that may be used to determine a credit score (e.g., data identifying an income, a number of open lines of credit, an amount of outstanding debt, a mortgage payment history, etc.), and/or the like.

In some implementations, the credit data of the individual may be shared using the network of nodes (shown as Node 1 through Node N). For example, the network of nodes may support the blockchain, which may include a set of blocks that store the credit data and/or information associated with the credit data as blocks in the blockchain.

In some implementations, the smart contract for the individual may be stored as a block within the blockchain. In some implementations, data included as part of the smart contract may be stored as separate blocks within the blockchain. In some implementations, the network of nodes may access the smart contract by searching a particular storage location within the blockchain. In some implementations, each node in the network of nodes may store a copy of the smart contract, as described further herein.

The smart contract may include information identifying a list of organizations that the individual has given permission to access the credit data, storage information for particular credit data, one or more functions associated with obtaining the credit data or providing new credit data, an incentives function associated with creating incentives for the group of organizations to continue to use the network of nodes to obtain the credit data or to provide new credit data. The information identifying the list of organizations may include an organization identifier (ID) for an organization, a public key associated with each organization that has been given permission to access the credit data, information indicating a type of access (e.g., an organization may be permitted to read the credit data, write (e.g., add new, modify existing, etc.) the credit data, etc.), and/or the like. The storage information for particular credit data may include a storage identifier that serves as an association (e.g., a pointer) to a memory location where the credit data is stored within the distributed file system (shown as Hashed Address 1 through Hashed Address M), as described further herein.

The functions associated with obtaining the credit data or providing new credit data may include a read function (e.g., to process requests by organizations that request to read the credit data), a write function (e.g., to process requests by organizations that request to write the credit data), and/or the like. The incentives function may require that tokens (e.g., cryptocurrency) be provided to perform the functions associated with obtaining the credit data or providing new credit data. For example, for an organization (e.g., a financial institution) to read particular credit data, the organization may have to pay tokens to another organization (e.g., another financial institution) that wrote the particular credit data into the blockchain.

The distributed file system may be supported by the network of nodes and/or may be supported by one or more third-party organizations. For example, the blockchain may be unable to support large quantities of credit data (e.g., gigabytes of credit data, terabytes of credit data, etc.). In this case, the distributed file system may be used to handle data storage for the credit data, and may store the credit data using one or more data structures, such as a tree (e.g., a binary search tree (BST), a red-black (RB) tree, a B-tree, etc.), a graph, a distributed database, a hash table, a linked list, and/or the like. Additionally, the blockchain may store storage identifiers (e.g., hashed addresses) for particular credit data, where the storage identifiers serve as pointers to memory locations at which the particular credit data is stored within the distributed file system.

In this way, the individual and the group of organizations are able to securely share the credit data of the individual using the distributed ledger, the smart contract, and the distributed file system.

Figure 1B:
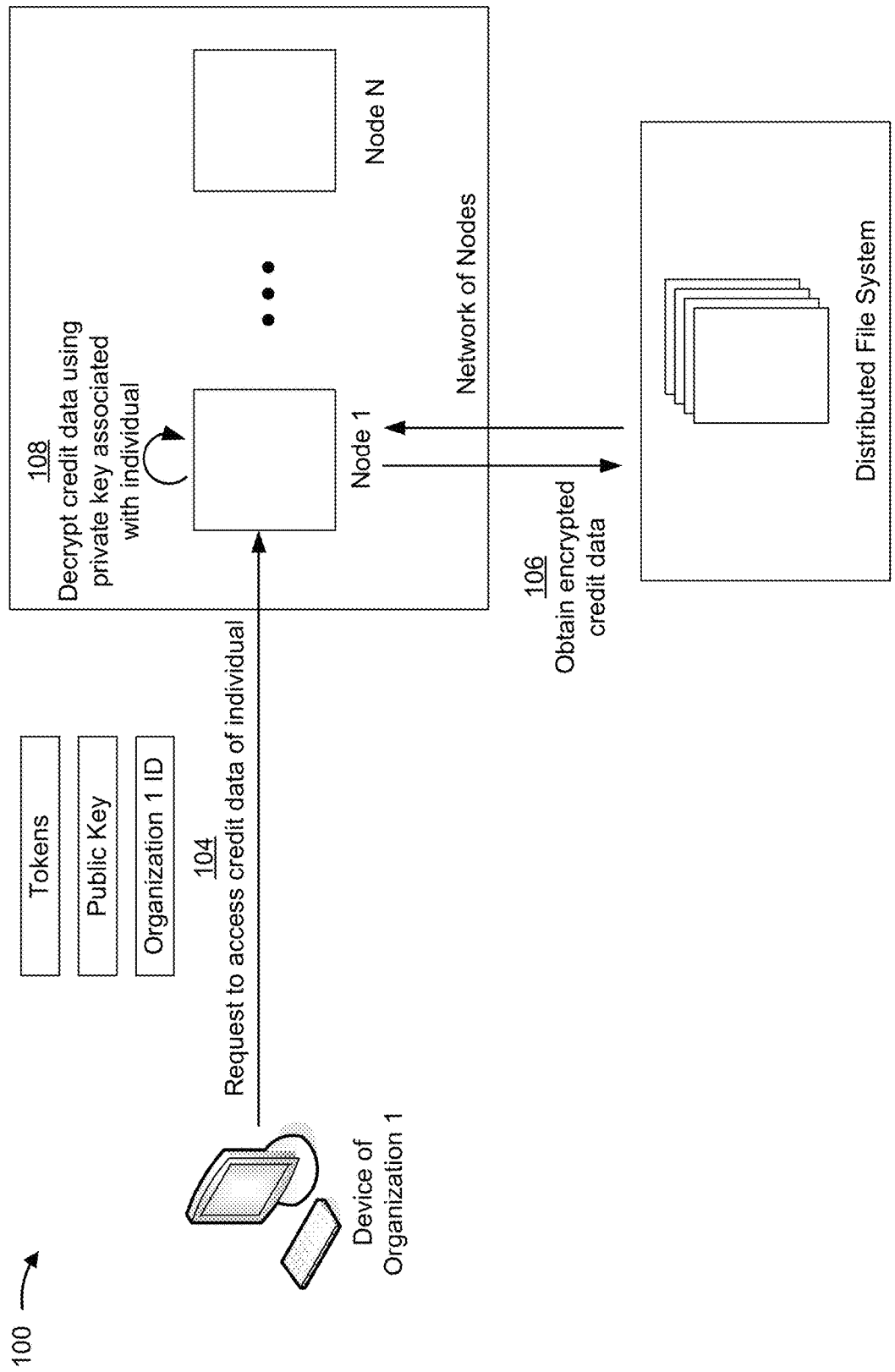

As shown in FIG. 1B, and by reference number 104, a device associated with a first organization (shown as Device of Organization 1) may provide, to a first node, a request to access the credit data of the individual. For example, the individual may have applied for credit with the first organization, which may have caused the first organization to request access to the credit data of the individual.

The request may include an organization ID for the first organization, a public key associated with the first organization, one or more tokens, and/or the like. The public key may be part of a key pair (e.g., the public key and a corresponding private key) that are associated with the first organization, whereby the private key is only accessible to the first organization and may be used to decrypt data, and the public key may be provided to other parties and may be used to encrypt data. In some cases, the first organization may have to compensate the individual for the credit data, in which case tokens may be provided as part of the request.

As shown by reference number 106, the first node may interact with the distributed file system to obtain encrypted credit data of the individual. For example, to be approved for the credit, the individual may instruct the first node to obtain the encrypted credit data. In this case, the first node may obtain the storage identifiers of the credit data (e.g., the hashed addresses) from the smart contract, and may use the storage identifiers to search the distributed file system to obtain the encrypted credit data.

As shown by reference number 108, the first node may use a private key to decrypt the credit data. For example, the first node may store a private key that is accessible only to the individual, which may be used for decrypting the credit data. The private key may be associated with one or more public keys, which may be distributed to organizations that are permitted to access the credit data, and which may be used for encrypting the credit data, as described further herein.

In this way, the first node is able to receive a request for the credit data of the individual, and is able to interact with the smart contract and the distributed file system to obtain the credit data.

Figure 1C:
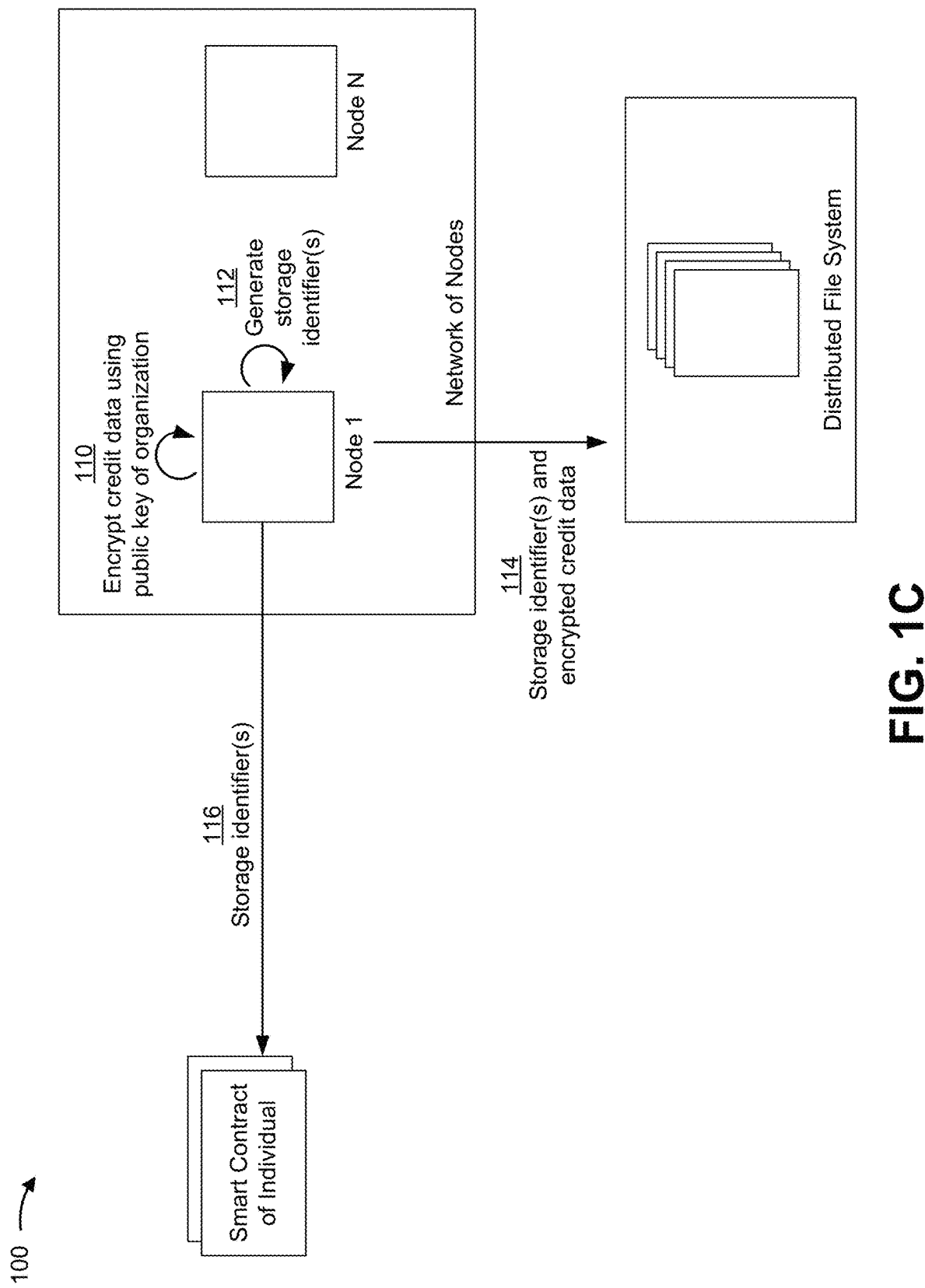

As shown in FIG. 1C, and by reference number 110, the first node may encrypt (i.e., re-encrypt) the credit data using the public key of the first organization. For example, the first node may use the public key that was included in the request to encrypt the credit data.

As shown by reference number 112, the first node may generate a set of storage identifiers for the encrypted credit data. For example, the first node may execute a mapping function, such as a hash function, that is able to generate a set of hash values for the credit data. As described above, a hash value may serve as a storage identifier (e.g., an address) that is able to be used as a pointer to a memory location within the distributed file system. In some cases, the first node may generate a single hash value, which may serve as a storage identifier to a memory location that may be used to identify all of the credit data. In some cases, the first node may generate a set of hash values, where each of the set of hash values may serve as storage identifiers to respective memory locations that may be used to identify corresponding portions of the credit data.

As shown by reference number 114, the first node may provide the set of storage identifiers and the encrypted credit data to the distributed file system. As shown by reference number 116, the first node may provide the set of storage identifiers to be stored as part of the smart contract of the individual. For example, the first node may have access to a first copy of the smart contract of the individual, and may update the first copy of the smart contract with the set of storage identifiers. Additionally, the first node may broadcast the set of storage identifiers to the network of nodes to allow each of the network of nodes to update a local copy of the smart contract with the set of storage identifiers. Furthermore, the smart contract of the individual may be used to store the set of storage identifiers in a list, whereby each storage identifier, of the set of storage identifiers, is an address to particular credit data (e.g., each credit event associated with the individual may have a different storage identifier).

In this way, the set of storage identifiers may be stored as part of the smart contract, such that an organization with access to the smart contract may be able to obtain and use the set of storage identifiers to identify memory locations within the distributed file system that store the encrypted credit data, as described further herein.

Figure 1D:
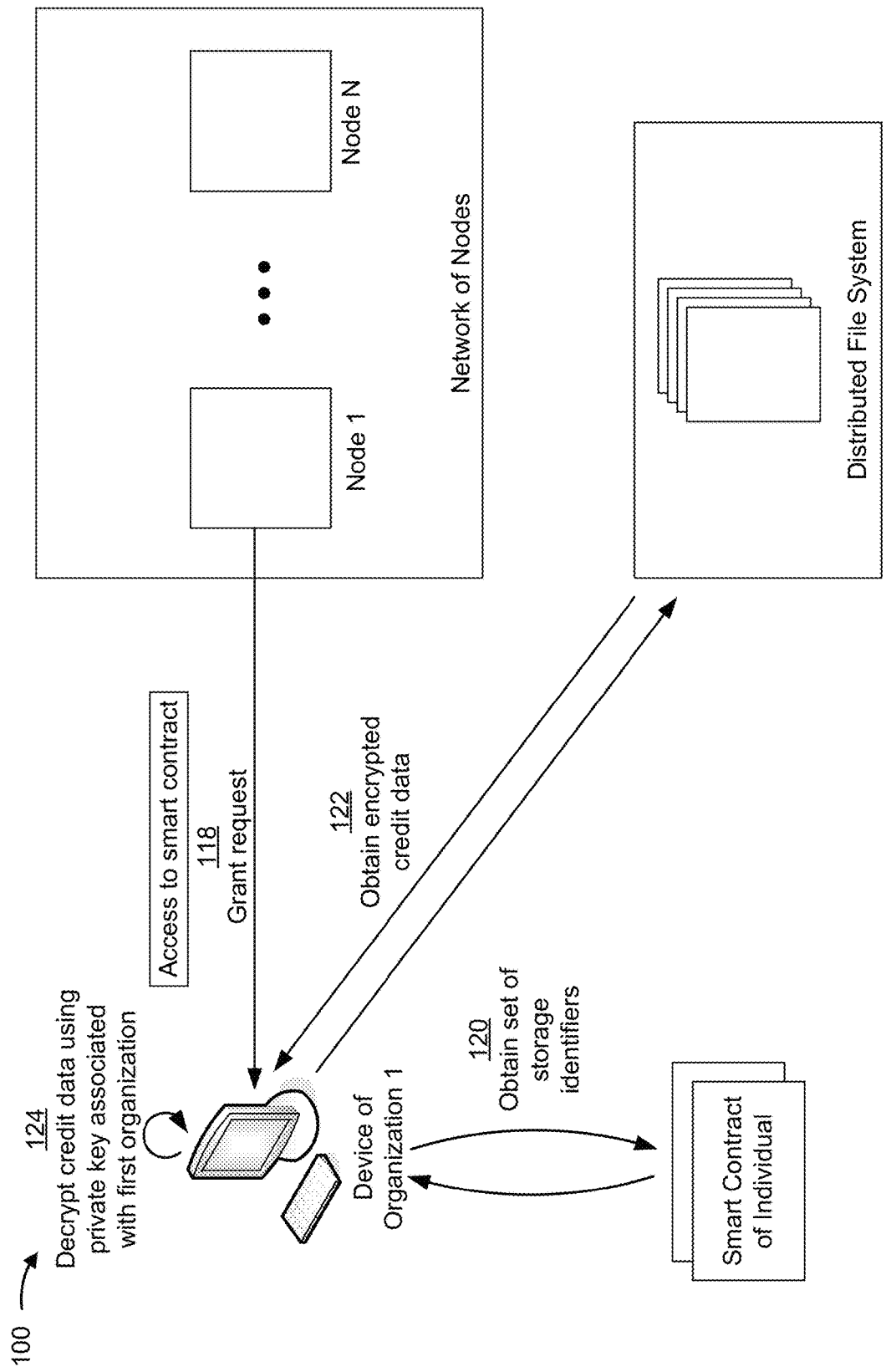

As shown in FIG. 1D, and by reference number 118, the first node may provide, to the device of the first organization, a notification indicating that the request to access the credit data of the individual has been granted. For example, the first organization may be added to the list of organizations permitted to access the credit data (e.g., which is stored as part of the smart contract).

Furthermore, the message granting the request may indicate that the first organization is permitted to utilize a read function of the smart contract, which may be used to read the credit data. In some cases, the first organization may not be permitted to utilize a write function of the smart contract until the first organization provides the individual with credit, as described further herein.

As shown by reference number 120, the device of the first organization may obtain the set of storage identifiers identifying addresses to memory locations used to store the encrypted credit data. For example, the device of the first organization may search the smart contract to identify the set of storage identifiers. In this case, the smart contract may associate the set of storage identifiers with organization identifiers of organizations that provided particular credit data and with public keys associated with the organizations.

In some implementations, rather than access the smart contract directly, the device associated with the first organization may be assigned a particular node, and the particular node may obtain the set of storage identifiers. For example, the device associated with the first organization may, after receiving access to the credit data, provide a request for the credit data to the particular node. The request may include an organization identifier associated with the first organization. In this case, the particular node may search the smart contract to verify that the organization identifier is on the list of organizations that are permitted to access the credit data and may obtain the set of storage identifiers needed to search the distributed file system for the credit data.

As shown by reference number 122, the device of the first organization may use the set of storage identifiers to search the distributed file system to obtain the encrypted credit data. For example, the credit data may be stored as encrypted data within the distributed file system (e.g., which had been encrypted using the public key of the first organization), and the device of the first organization may use the set of storage identifiers to search the distributed file system to obtain the encrypted credit data. In this case, the distributed file system may use a data structure that associates the set of storage identifiers with the encrypted credit data and with organization identifiers for organizations that provided particular credit data to the distributed file system.

In some implementations, rather than access the distributed file system directly, the device associated with the first organization may be assigned the particular node, and the particular node may obtain the credit data. For example, as described above, the device associated with the first organization may provide the request for the credit data to the particular node, which may cause the particular node to obtain the set of storage identifiers. In this case, the particular node may use the set of storage identifiers to search the distributed file system for the credit data, and may provide the credit data to the device associated with the first organization.

As shown by reference number 124, the device of the first organization may use a private key associated with the first organization to decrypt the credit data. For example, the first organization may have a private key, and, as described above, may have previously provided a corresponding public key to the first node (e.g., which the first node used to encrypt the credit data). In this case, the device of the first organization may use the private key to decrypt the credit data.

In this way, the device of the first organization is able to obtain the credit data of the individual, which may be processed to determine whether to grant the individual with credit.

Figure 1E:
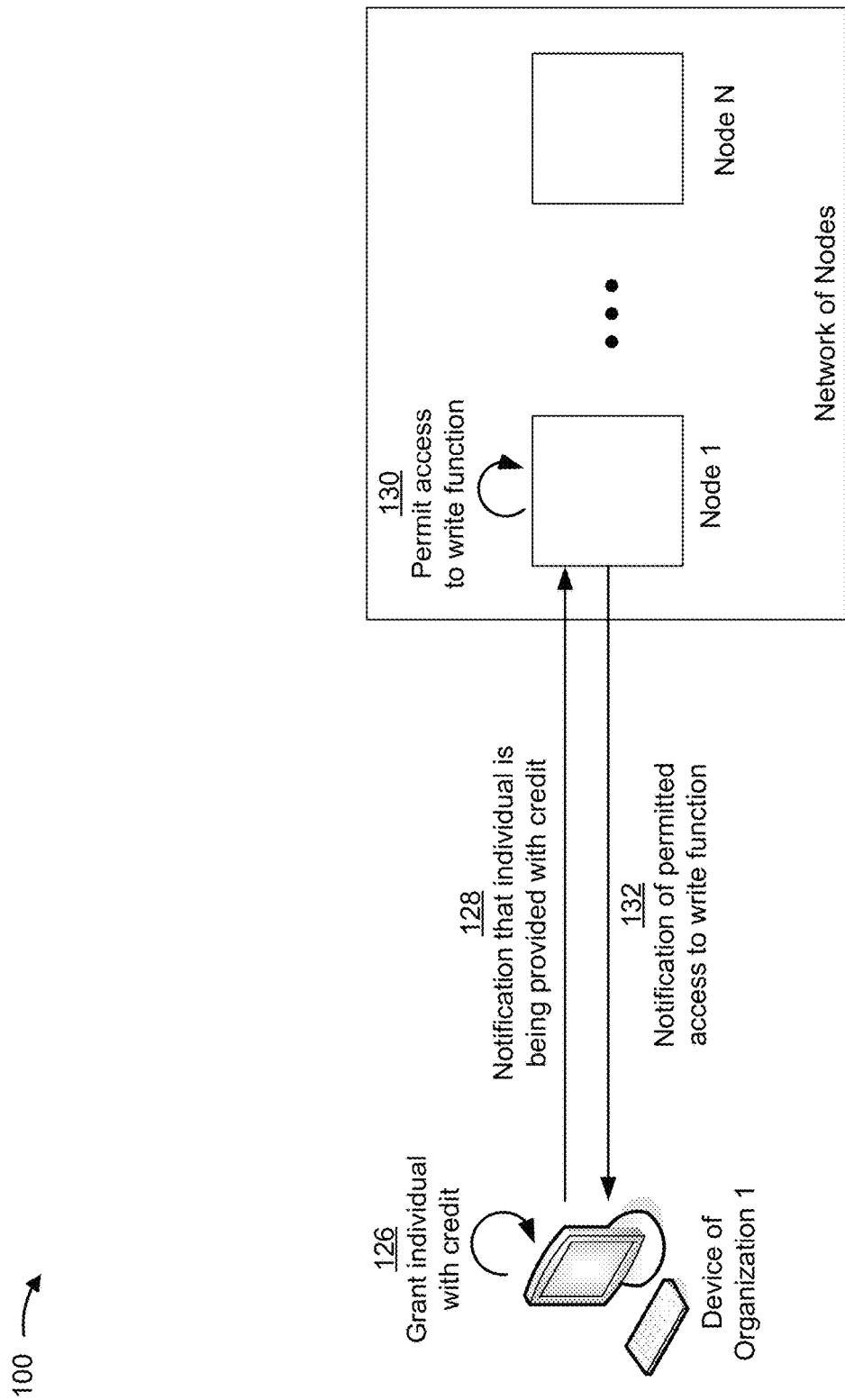

As shown in FIG. 1E, and by reference number 126, the device of the first organization may grant the individual with credit. For example, the device associated with the organization may analyze the credit data and may determine, based on the analysis, to grant the individual with credit. As shown by reference number 128, the device of the first organization may provide, to the first node (or to another device or account associated with the individual), a notification indicating that the individual is being granted with credit.

As shown by reference number 130, the first node may permit the first organization to access the write function of the smart contract. For example, because the individual has been granted with credit, the first organization may have new credit data associated with the individual that needs to be added to the blockchain (e.g., records of timely payments, untimely payments, and/or the like). As such, the first organization may be permitted to access the write function of the smart contract so that the first organization may add the new credit data to the blockchain. As shown by reference number 132, the first node may provide the device of the first organization with a notification indicating that access to the write function has been permitted.

Figure 1F:
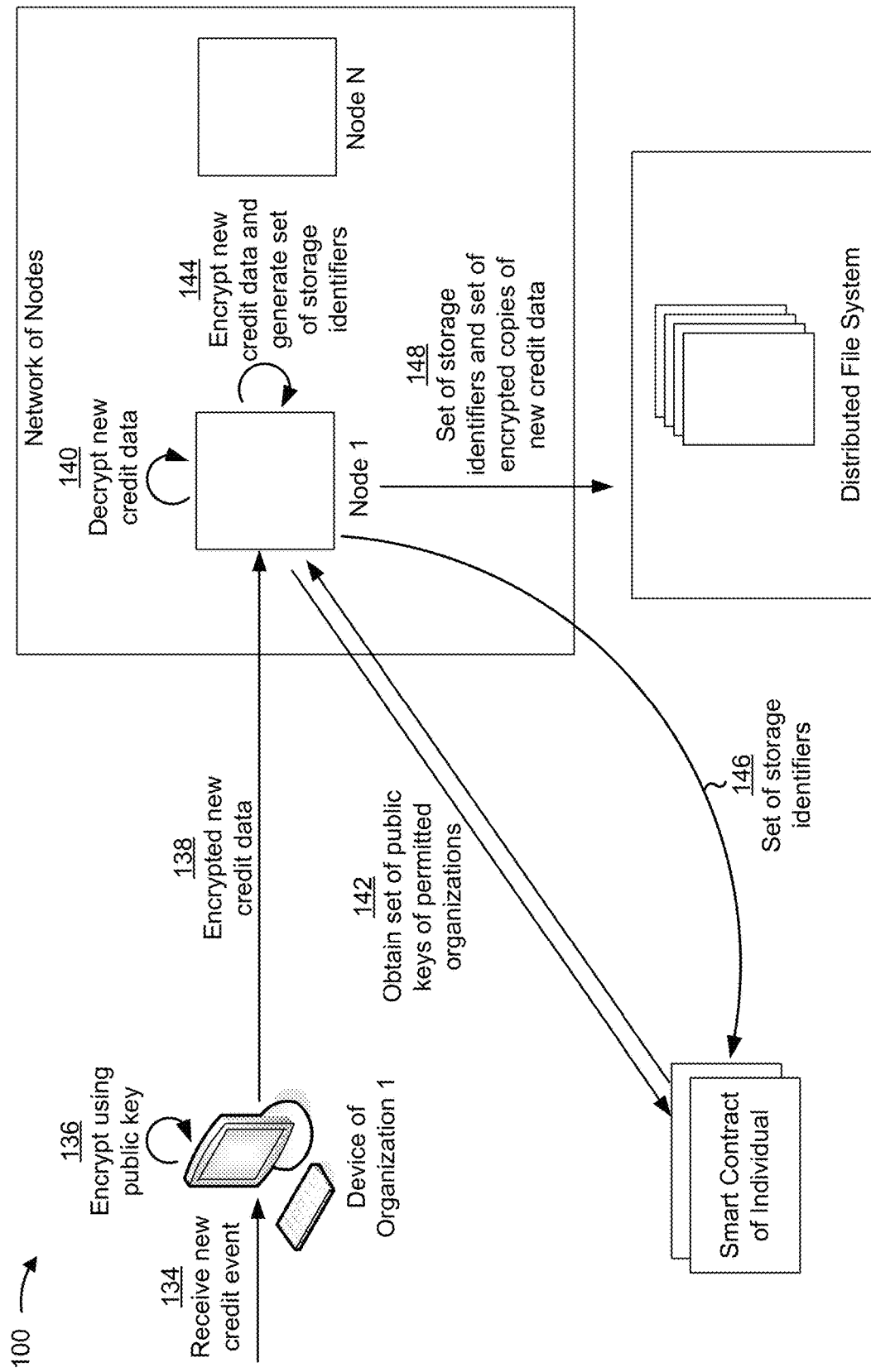
Figure 1G:
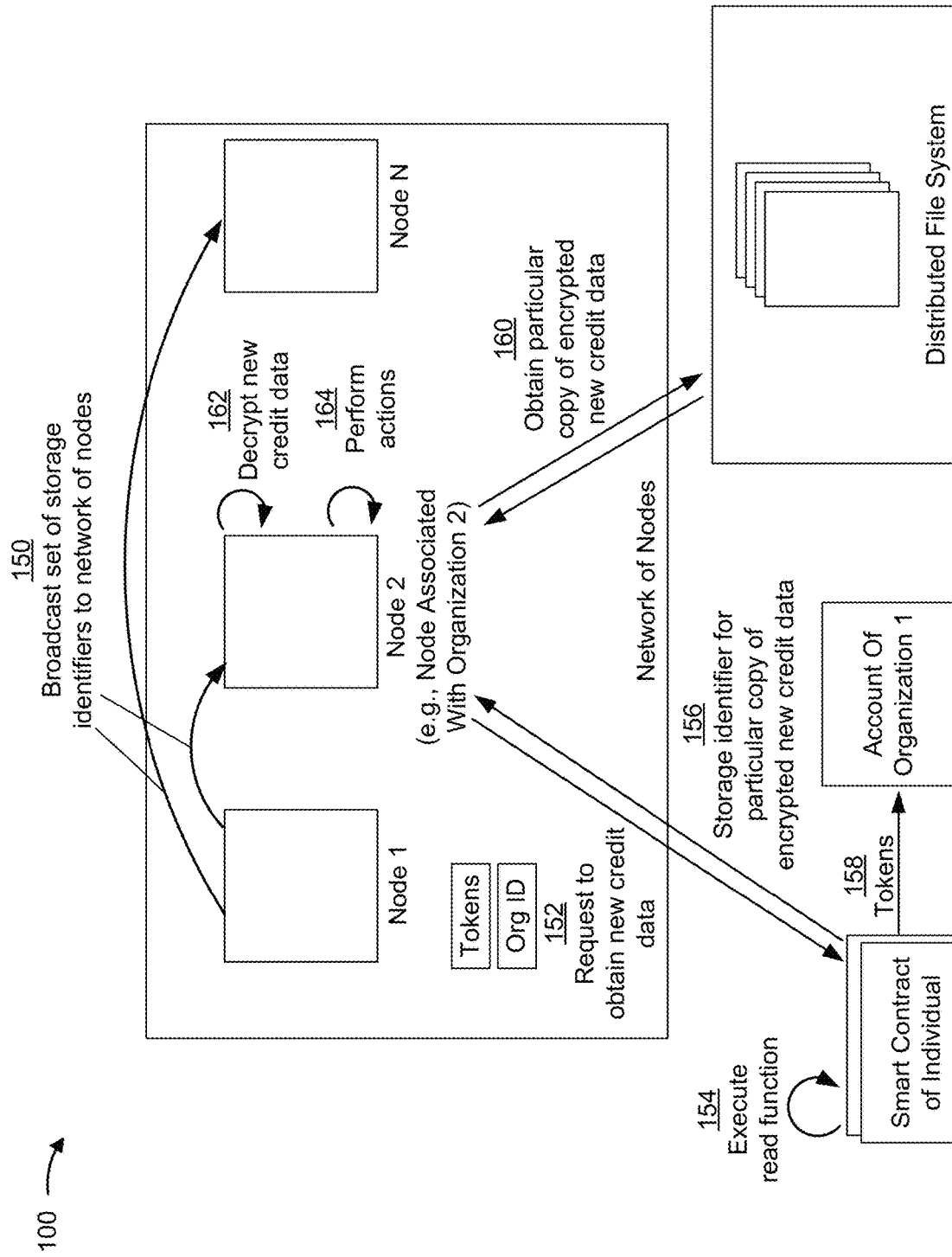

In this way, the device of the first organization is able to use the write function of the smart contract to add new credit data to the blockchain, as described with regard to FIGS. 1F and 1G.

As shown in FIG. 1F, and by reference number 134, the device of the first organization may receive new credit data. For example, the device of the first organization may receive new credit data indicating that the individual opened a new account, made a timely payment, failed to make a timely payment, and/or the like.

As shown by reference number 136, the device of the first organization may encrypt the new credit data using a public key. For example, the device of the first organization may encrypt the new credit data using the public key associated with the individual and/or public keys associated with other institutions which have been granted write access, which may have been provided to the device associated with the first organization when the first organization was permitted to access the read function and/or the write function of the smart contract. In some implementations, the device associated with the first organization may encrypt the new credit data using the public key associated with the first organization. As shown by reference number 138, the device of the first organization may provide the encrypted new credit data to the first node.

As shown by reference number 140, the first node may decrypt the new credit data. For example, the first node may use a private key associated with the individual or a private key associated with the first organization to decrypt the new credit data.

As shown by reference number 142, the first node may obtain, from the smart contract, a set of public keys associated with organizations that are permitted to access the new credit data. For example, the smart contact may store a list of organization identifiers of organizations that are permitted to access the new credit data, and the list of organization identifiers may be stored in association with the set of public keys of the organizations. This may allow the first node to search (e.g., query) the smart contact to obtain the set of public keys.

As shown by reference number 144, the first node may encrypt the new credit data and may generate a set of storage identifiers for the new credit data. For example, the first node may encrypt a set of copies of the new credit data using the set of public keys, such that each organizations public key is used to create an encrypted copy of the new credit data. In this case, the first node may execute a mapping function, such as a hash function (e.g., as described elsewhere herein), to generate a set of storage identifiers for the set of copies of the new credit data.

As shown by reference number 146, the first node may provide the set of storage identifiers to the smart contract of the individual (e.g., to a local copy of the smart contract that is accessible to the first node). For example, the smart contract may store the set of storage identifiers for the encrypted new credit data in a manner that associates the set of storage identifiers with one or more identifiers associated with the organizations (e.g., organization identifiers, public keys of the organizations, etc.). As shown by reference number 148, the first node may provide the set of storage identifiers and the encrypted copies of the new credit data to the distributed file system.

In this way, the encrypted copies of the new credit data may be stored in association with the set of storage identifier, thereby allowing organizations to use nodes to execute the read function of the smart contract to identify memory locations of particular copies of encrypted new credit data. This may allow organizations to instruct nodes to reference the memory location to obtain the particular copies of the encrypted new credit data, as described further herein.

As shown in FIG. 1G, and by reference number 150, the first node may broadcast the set of storage identifiers to the network of nodes (or to one or more nodes in the network of nodes). For example, the first node may search the smart contract to obtain organization identifiers and organization addresses of nodes associated with particular organizations that are permitted to access the new credit data. In some cases, the first node may have already obtained the organization identifiers and organization addresses (e.g., when the first node searched the smart contract for the key of public keys). Next, the first node may broadcast the set of storage identifiers to the addresses of nodes associated with the particular organizations that are permitted to access the new credit data.

In some implementations, nodes that receive the set of storage identifiers may update local copies of the smart contract. For example, the nodes may update local copies of the smart contract to include the set of storage identifiers, such that organizations associated with those nodes are able to obtain the set of storage identifiers for obtaining (e.g., reading) particular new credit data that may have been provided to the blockchain.

As shown by reference number 152, a second node that is associated with a second organization may interact with the smart contract (e.g., a local copy of the smart contract) to request to obtain (e.g., read) the new credit data. The request may include an organization identifier associated with the second organization, tokens (e.g., digital currency, such as cryptocurrency) that may serve as payment for accessing the new credit data, and/or the like. In this case, the network of nodes may adhere to an agreement indicating that a certain amount of tokens must be provided to read credit data (and/or new credit data).

The tokens may be provided to an organization writing the credit data, which may create incentives for organizations to continue to add new credit data to the blockchain of the individual. For example, for the first organization to obtain new credit data provided by other organizations, the first organization may need to first earn tokens by providing new credit data to the blockchain. This ensures that the blockchain remains updated with current credit data of the individual.

As shown by reference number 154, the smart contract may execute the read function. For example, the smart contract may verify that the second organization is permitted to access the new credit data and/or may verify that the second organization has provided a requisite amount of tokens. If the verifications succeed, the smart contract may execute the read function, which, as shown by reference number 156, may cause a storage identifier for a particular copy of the encrypted new credit data to be provided to the second node. As shown by reference number 158, the smart contract may provide the tokens to an account associated with the first organization. In this case, the first organization may be the recipient of the tokens because the first organization provided the new credit data.

In some cases, the request to read the new credit data may include an offer of tokens (but not the actual tokens). In this case, the smart contract may, after receiving the offer, interact with an account associated with the second organization and the account associated with the first organization to orchestrate the transfer of tokens from the account associated with the second organization to the account associated with the first organization.

As shown by reference number 160, the second node may obtain, from the distributed file system, the particular copy of the encrypted new credit data. For example, the second node may use the storage identifier to identify the memory location of a copy of the encrypted new credit data that is associated with the second organization, and may search the memory location to obtain the copy of the encrypted new credit data. As shown by reference number 162, the second node may decrypt the copy of the new credit data (e.g., using the private key associated with the second organization).

As shown by reference number 164, the second node may perform one or more actions associated with the copy of the new credit data. For example, the second node may provide the copy of the new credit data for display on an interface that is accessible to the second organization and/or may provide the new credit data to a device associated with the second organization. This may allow employees or devices of the second organization to process the copy of the new credit data (e.g., to decide whether to offer the individual additional credit, a new credit-related service, and/or the like).

In some implementations, the network of nodes may continue to exchange new credit data and tokens as the individual builds a credit history. In this way, the incentivization provided by the exchange of the new credit and the tokens ensures that the blockchain continues to be provided with up to date credit information of the individual.

In some implementations, one or more machine learning models may be utilized to improve performance with systems, processes, and/or functions described herein. For example, a node may train a machine learning model on historical credit data (or may receive a trained machine learning model), such that the node is able to use the machine learning model to determine a credit score for the individual, determine an amount of credit to grant the individual, determine a type of credit to offer the individual, and/or the like. Additionally, or alternatively, the node may train a machine learning model on historical network data, such that the machine learning model is able to make optimization decisions relating to storage of credit data. In this case, the machine learning model may be associated with the mapping function, such that the machine learning model may be used with the mapping function to output storage identifiers of memory locations that maximize storage efficiency within the distributed file system.

In this way, the network of nodes is able to securely exchange credit data of the individual. Additionally, by incentivizing organizations to continue to add new credit data, the blockchain of the individual will remain updated, thereby serving as a reliable indicator of credit worthiness of the individual. Furthermore, the network of nodes conserves processing resources and/or network resources and/or memory resources. For example, a node conserves processing resources and/or network resources that might otherwise be used to query a set of credit bureau data sources to obtain credit data of the individual. As another example, by utilizing a distributed file system to store the credit data, the node improves in scalability, and conserves memory resources that might otherwise be used to attempt to store the credit data on the blockchain.

As indicated above, FIGS. 1A-1G are provided merely as examples. Other examples are possible and may differ from what was described with regard to FIGS. 1A-1G. For example, in some implementations, the network of nodes may be implemented with a management node (e.g., a ledger management platform). In this case, one or more techniques and/or features that are described as being performed by the set of nodes may be performed by the management node.

Figure 2:
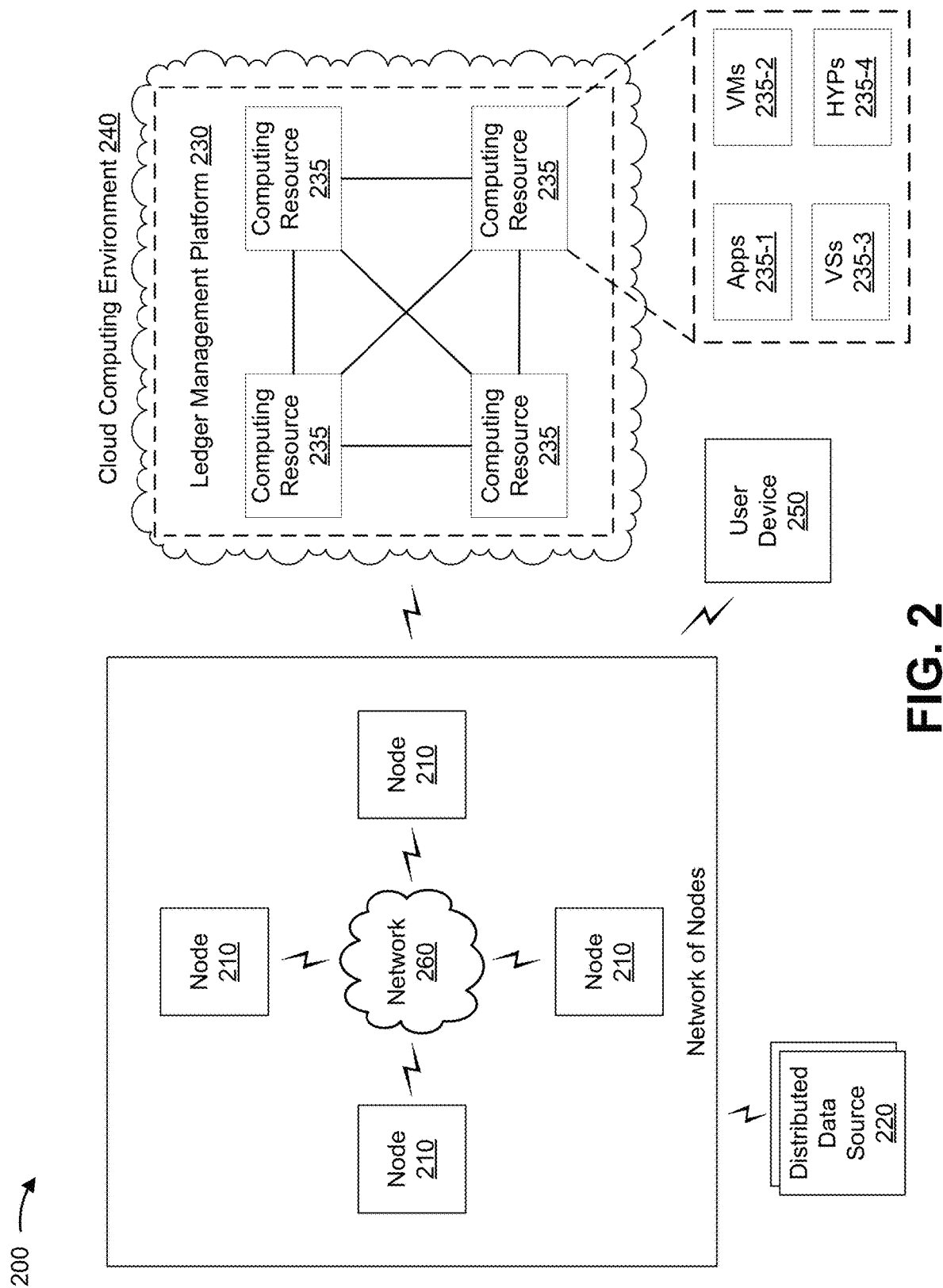
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a node 210, a distributed data source 220, a ledger management platform 230 hosted within a cloud computing environment 240, a user device 250, and/or a network 260. Devices of environment 200 may interconnect via wired connections, wireless connections, or a combination of wired and wireless connections.

Node 210 includes one or more devices capable of receiving, generating, storing, processing, and/or providing information associated with credit of an individual. For example, node 210 may include a computing device (e.g., a desktop computer, a laptop computer, a tablet computer, a handheld computer, a server device, etc.), a mobile phone (e.g., a smart phone, a radiotelephone, etc.), or a similar device.

In some implementations, a set of nodes 210 may be part of a network that is able to utilize a distributed ledger and/or a distributed file system to securely share credit data of an individual. In some implementations, node 210 may be associated with an individual that has a credit history. Additionally, or alternatively, node 210 may be associated with an organization such as a financial institution. In some implementations, node 210 may store a smart contract associated with an individual. In this case, the smart contract may include a storage identifier (e.g., a hashed value) that serves as a pointer to a memory location within a distributed file system supported by distributed data source 220.

Distributed data source 220 includes one or more devices capable of receiving, generating, storing, processing, and/or providing information associated with credit of an individual. For example, distributed data source 220 may include a computing device, such as a server, a desktop computer, a laptop computer, a tablet computer, a handheld computer, or a similar device. In some implementations, distributed data source 220 may support a distributed file system that is used to store the credit data of the individual. In some implementations, distributed data source 220 may store encrypted credit data for the individual, and may associate the encrypted credit data with one or more storage identifiers and/or organization identifiers.

Ledger management platform 230 includes one or more devices capable of receiving, generating, storing, processing, and/or providing information associated with credit of an individual. For example, ledger management platform 230 may include a server or a group of servers. In some implementations, ledger management platform 230 may perform one or more actions described as being performed by node 210.

In some implementations, as shown, ledger management platform 230 may be hosted in cloud computing environment 240. Notably, while implementations described herein describe ledger management platform 230 as being hosted in cloud computing environment 240, in some implementations, ledger management platform 230 may not be cloud-based (i.e., may be implemented outside of a cloud computing environment) or may be partially cloud-based.

Cloud computing environment 240 includes an environment that hosts ledger management platform 230. Cloud computing environment 240 may provide computation, software, data access, storage, etc. services that do not require end-user knowledge of a physical location and configuration of system(s) and/or device(s) that hosts ledger management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host ledger management platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 may include one or more software applications that may be provided to or accessed by node 210 and/or distributed data source 220. Application 235-1 may eliminate a need to install and execute the software applications on these devices. For example, application 235-1 may include software associated with ledger management platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of another device (e.g., node 210 and/or distributed data source 220), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

User device 250 includes one or more devices capable of receiving, generating, storing, processing, and/or providing information associated with credit of an individual. For example, user device 250 may include a computing device (e.g., a desktop computer, a laptop computer, a tablet computer, a handheld computer, a server device, etc.), a mobile phone (e.g., a smart phone, a radiotelephone, etc.), or a similar device. In some implementations, user device 250 may be associated with an organization, such as a financial institution, that is not part of the set of nodes 210, but that is requesting access to credit data associated with an individual.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
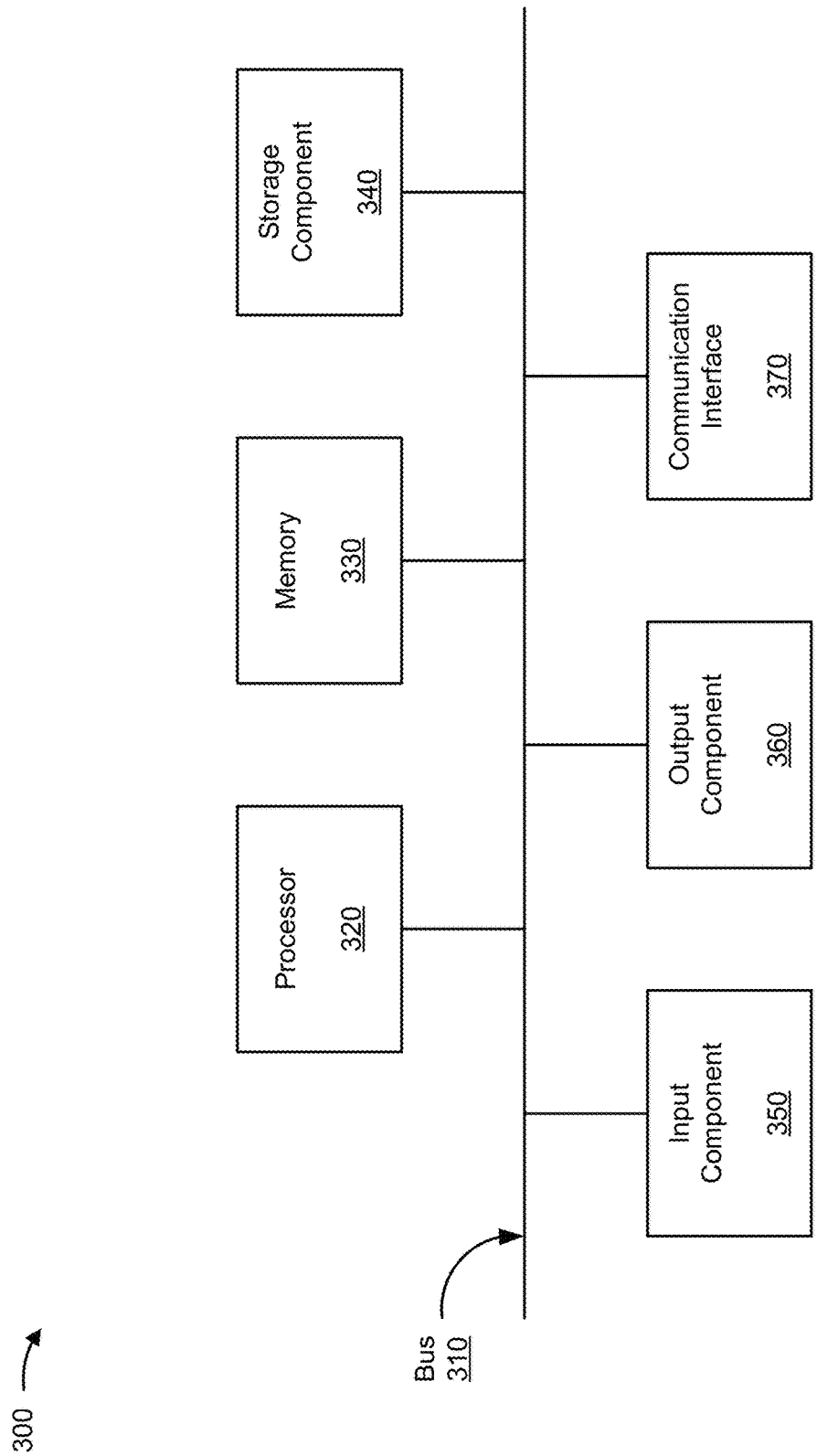
FIG. 3 is a diagram of example components of one or more devices of FIG. 2.

FIG. 3 is a diagram of example components of a device 300. Device 300 may correspond to node 210, distributed data source 220, ledger management platform 230, computing resource 235, and/or user device 250. In some implementations, node 210, distributed data source 220, ledger management platform 230, computing resource 235, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 includes a component that provides output information from device 300 (e.g., a display, a speaker, one or more light-emitting diodes (LEDs), etc.).

Communication interface 370 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
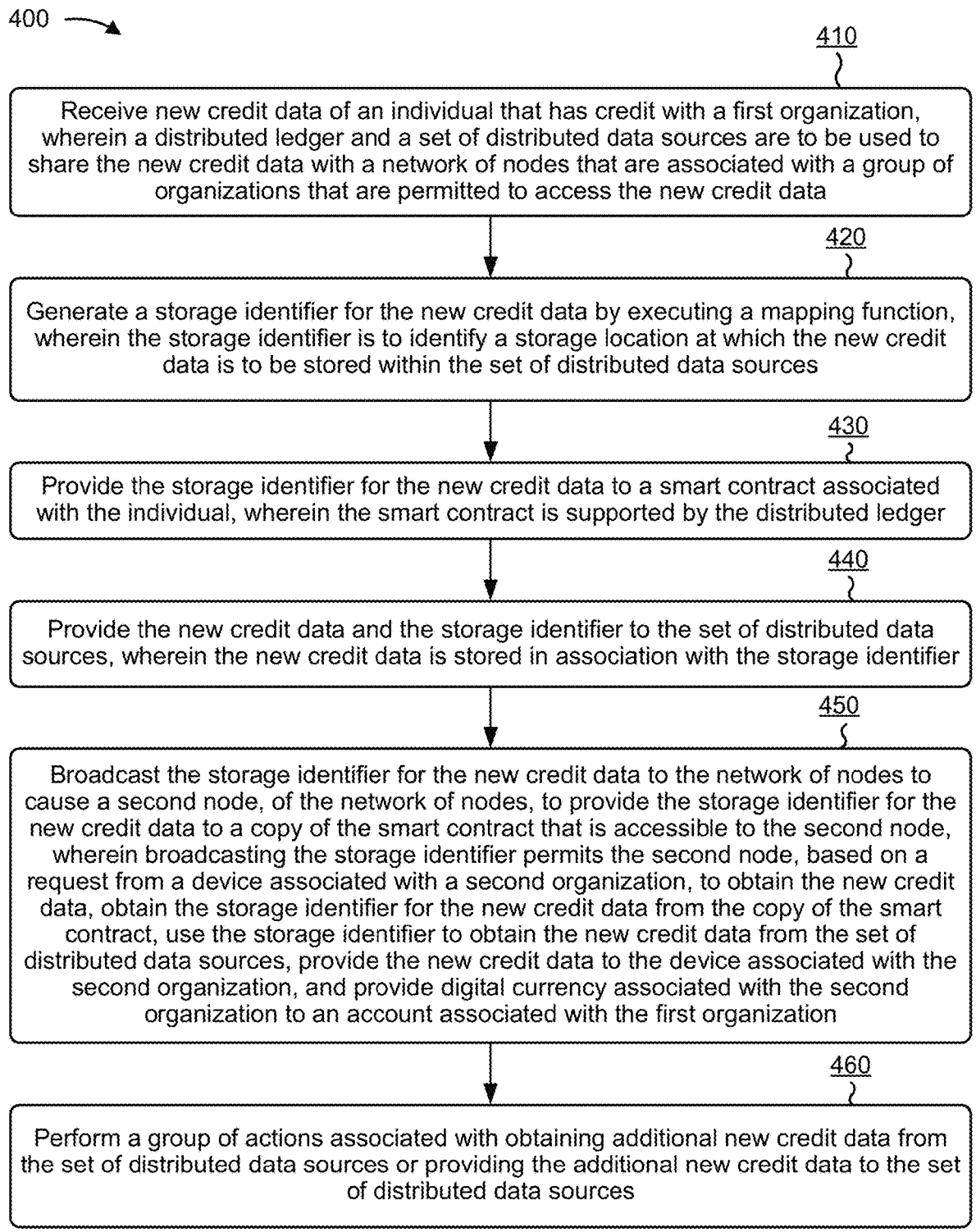

FIG. 4 is a flow chart of an example process 400 for sharing credit data of an individual among a network of nodes that have access to a distributed ledger, a smart contract associated with the individual, and a distributed file system. In some implementations, one or more process blocks of FIG. 4 may be performed by a device, such as a first node (e.g., node 210). In some implementations, one or more process blocks of FIG. 4 may be performed by another device or a group of devices separate from or including the first node, such as another node, a distributed data source (e.g., distributed data source 220), a ledger management platform (e.g., ledger management platform 230), and/or a user device (e.g., user device 250).

As shown in FIG. 4, process 400 may include receiving new credit data of an individual that has credit with a first organization, wherein a distributed ledger and a set of distributed data sources are to be used to share the new credit data with a network of nodes that are associated with a group of organizations that are permitted to access the new credit data (block 410). For example, the first node (e.g., using processor 320, input component 350, communication interface 370, etc.) may receive new credit data of an individual that has credit with a first organization, as described above with regard to FIGS. 1A-1G. In some implementations, a distributed ledger and a set of distributed data sources may be used to share the new credit data with a network of nodes that are associated with a group of organizations that are permitted to access the new credit data.

As further shown in FIG. 4, process 400 may include generating a storage identifier for the new credit data by executing a mapping function, wherein the storage identifier is to identify a storage location at which the new credit data is to be stored within the set of distributed data sources (block 420). For example, the first node (e.g., using processor 320, storage component 340, etc.) may generate a storage identifier for the new credit data by executing a mapping function, as described above with regard to FIGS. 1A-1G. In some implementations, the storage identifier may identify a storage location at which the new credit data is to be stored within the set of distributed data sources.

As further shown in FIG. 4, process 400 may include providing the storage identifier for the new credit data to a smart contract associated with the individual, wherein the smart contract is supported by the distributed ledger (block 430). For example, the first node (e.g., using processor 320, output component 360, communication interface 370, etc.) may provide the storage identifier for the new credit data to a smart contract associated with the individual, as described above with regard to FIGS. 1A-1G. In some implementations, the smart contract may be supported by the distributed ledger.

As further shown in FIG. 4, process 400 may include providing the new credit data and the storage identifier to the set of distributed data sources, wherein the new credit data is stored in association with the storage identifier (block 440). For example, the first node (e.g., using processor 320, output component 360, communication interface 370, etc.) may provide the new credit data and the storage identifier to the set of distributed data sources, as described above with regard to FIGS. 1A-1G. In some implementations, the new credit data may be stored in association with the storage identifier.

As further shown in FIG. 4, process 400 may include broadcasting the storage identifier for the new credit data to the network of nodes to cause a second node, of the network of nodes, to provide the storage identifier for the new credit data to a copy of the smart contract that is accessible to the second node, wherein broadcasting the storage identifier permits the second node, based on a request from a device associated with a second organization, to obtain the new credit data, obtain the storage identifier for the new credit data from the copy of the smart contract, use the storage identifier to obtain the new credit data from the set of distributed data sources, provide the new credit data to the device associated with the second organization, and provide digital currency associated with the second organization to an account associated with the first organization (block 450). For example, the first node (e.g., using processor 320, output component 360, communication interface 370, etc.) may broadcast the storage identifier for the new credit data to the network of nodes to cause a second node, of the network of nodes, to provide the storage identifier for the new credit data to a copy of the smart contract that is accessible to the second node, as described above with regard to FIGS. 1A-1G.

In some implementations, the first node broadcasting the storage identifier may permit the second node, based on a request from a device associated with a second organization (e.g., the user device), to obtain the new credit data, obtain the storage identifier for the new credit data from the copy of the smart contract, use the storage identifier to obtain the new credit data from the set of distributed data sources, provide the new credit data to the device associated with the second organization, and provide digital currency associated with the second organization to an account associated with the first organization.

As further shown in FIG. 4, process 400 may include performing a group of actions associated with obtaining additional new credit data from the set of distributed data sources or providing the additional new credit data to the set of distributed data sources (block 460). For example, the first node (e.g., using processor 320, memory 330, storage component 340, input component 350, output component 360, communication interface 370, etc.) may perform a group of actions associated with obtaining additional new credit data from the set of distributed data sources or providing the additional new credit data to the set of distributed data sources, as described above with regard to FIGS. 1A-1G.

Process 400 may include additional implementations, such as any single implementation or any combination of implementations described below and/or in connection with one or more other processes described elsewhere herein.

In some implementations, the smart contract may be used exclusively for the individual. In some implementations, the smart contract may include data identifying the group of organizations that are permitted to access the new credit data, a set of storage identifiers identifying a set of storage locations associated with historical credit data of the individual, a first function associated with adding the new credit data to the set of distributed data sources, a second function associated with obtaining the new credit data from the set of distributed data sources, a third function associated with providing incentives to the group of organizations to use the network of nodes to interact with the smart contract to execute the first function and the second function.

In some implementations, while generating the storage identifier, the first node may generate, using a content addressing technique, a cryptographic hash value identifying the storage location at which the new credit data is to be stored within the set of distributed data sources. Additionally, the cryptographic hash value may be used as the storage identifier for the new credit data.

In some implementations, the device associated with the first organization may only be permitted to access the new credit data if an organization identifier for the first organization is stored by a data structure associated with the smart contract. Additionally, the organization identifier for the first organization may be stored by the data structure only after a particular amount of the digital currency associated with the first organization is provided to an account associated with the individual.

In some implementations, while performing the group of actions, the first node may obtain the additional new credit data from the set of distributed data sources. In this case, another node in the network of nodes may have provided the additional new credit data to the set of distributed data sources. Additionally, the other node may be associated with a particular organization. Additionally, obtaining the additional new credit data may cause the digital currency to be provided to an account associated with the particular organization.

In some implementations, while performing the group of actions, the first node may provide the additional new credit data to the set of distributed data sources to cause nodes associated with other organizations to obtain the additional new credit data in exchange for a particular amount of the digital currency. In some implementations, while performing the group of actions, the first node may automatically obtain the additional new credit data from the set of distributed data sources based on determining that the account associated with the first organization has a particular amount of the digital currency.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a call flow diagram of an example call flow 500 for sharing credit data of an individual among a network of nodes that have access to a distributed ledger, a smart contract associated with the individual, and a distributed file system. In some implementations, one or more process blocks of FIG. 5 may be performed by a device, such as a first node (e.g., node 210). In some implementations, one or more process blocks of FIG. 5 may be performed by another device or a group of devices separate from or including the first node, such as another node, a distributed data source (e.g., distributed data source 220), a ledger management platform (e.g., ledger management platform 230), and/or a user device (e.g., user device 250).

As shown in FIG. 5, process 500 may include receiving, by a first node associated with a first organization, a storage identifier for new credit data associated with an individual, wherein a distributed ledger and a set of distributed data sources are used to share the new credit data with a network of nodes that are associated with a group of organizations that are permitted to access the new credit data, wherein the storage identifier is used to identify a storage location at which the new credit data is to be stored within the set of distributed data sources, wherein the new credit data has been provided to the set of distributed data sources by a second node associated with a second organization of the group of organizations (block 510). For example, the first node may receive (e.g., using processor 320, input component 350, communication interface 370, etc.), by a first node that is associated with a first organization, a storage identifier for new credit data associated with an individual, as described above with regard to FIGS. 1A-1G.

In some implementations, a distributed ledger and a set of distributed data sources may be used to share the new credit data with a network of nodes that are associated with a group of organizations that are permitted to access the new credit data. In some implementations, the storage identifier may be used to identify a storage location at which the new credit data is to be stored within the set of distributed data sources. In some implementations, the new credit data may have been provided to the set of distributed data sources by a second node associated with a second organization of the group of organizations.

As shown in FIG. 5, process 500 may include updating a smart contract associated with the individual to include the storage identifier for the new credit data (block 520). For example, the first node (e.g., using processor 320, output component 360, communication interface 370, etc.) may update a smart contract associated with the individual to include the storage identifier for the new credit data, as described above with regard to FIGS. 1A-1G.

As shown in FIG. 5, process 500 may include receiving, from a device associated with the first organization, a request for the new credit data (block 530). For example, the first node (e.g., using processor 320, input component 350, communication interface 370, etc.) may receive, from a device associated with the first organization (e.g., the user device), a request for the new credit data, as described above with regard to FIGS. 1A-1G.

As shown in FIG. 5, process 500 may include obtaining, by the first node, the storage identifier for the new credit data from the smart contract (block 540). For example, the first node (e.g., using processor 320, input component 350, output component 360, communication interface 370, etc.) may obtain the storage identifier for the new credit data from the smart contract, as described above with regard to FIGS. 1A-1G. In some implementations, the first node obtaining the storage identifier from the smart contract may cause the smart contract to provide digital currency associated with the first organization to an account associated with the second organization.

As shown in FIG. 5, process 500 may include obtaining the new credit data by using the storage identifier to search the set of distributed data sources (block 550). For example, the first node (e.g., using processor 320, input component 350, output component 360, communication interface 370, etc.) may obtain the new credit data by using the storage identifier to search the set of distributed data sources, as described above with regard to FIGS. 1A-1G.

As shown in FIG. 5, process 500 may include providing the new credit data to the device associated with the first organization (block 560). For example, the first node (e.g., using processor 320, output component 360, communication interface 370, etc.) may provide the new credit data to the device associated with the first organization, as described above with regard to FIGS. 1A-1G.

As shown in FIG. 5, process 500 may include performing a group of actions associated with obtaining additional new credit data from the set of distributed data sources or providing the additional new credit data to the set of distributed data sources (block 570). For example, the first node (e.g., using processor 320, memory 330, storage component 340, input component 350, output component 360, communication interface 370, etc.) may perform a group of actions associated with obtaining additional new credit data from the set of distributed data sources or providing the additional new credit data to the set of distributed data sources, as described above with regard to FIGS. 1A-1G.

Process 500 may include additional implementations, such as any single implementation or any combination of implementations described below and/or in connection with one or more other processes described elsewhere herein.

In some implementations, the device associated with the first organization may only be permitted to access the new credit data if an organization identifier for the first organization is stored by a data structure associated with the smart contract. Additionally, the organization identifier for the first organization may be stored by the data structure only after a particular amount of the digital currency associated with the first organization is provided to an account associated with the individual.

In some implementations, the smart contract may be exclusive to the individual. Additionally, the smart contract may include data identifying the group of organizations that are permitted to access the new credit data, a set of storage identifiers identifying a set of storage locations associated with historical credit data of the individual, a first function associated with providing the new credit data to the set of distributed data sources, and/or a second function associated with obtaining the new credit data from the set of distributed data sources, wherein the second function requires that a particular amount of the digital currency be provided to obtain the new credit data.

In some implementations, the new credit data obtained from the set of distributed data sources may have been encrypted using a first key associated with the individual. Additionally, the first node may decrypt the new credit data using a second key associated with the individual. Additionally, the first node may encrypt the new credit data using a first key associated with the first organization. Additionally, while providing the new credit data to the device associated with the first organization, the first node may provide the new credit data that has been encrypted using the first key associated with the first organization to permit the device associated with the first organization to decrypt the new credit data using a second key associated with the first organization.

In some implementations, the smart contract may provide the digital currency to the account associated with the second organization by executing one or more functions associated with creating incentives for the group of organizations to use the network of nodes to continue to add the additional new credit data to the set of distributed data sources.

In some implementations, while performing the group of actions, the first node may obtain the additional new credit data from the set of distributed data sources to cause a particular amount of the digital currency to be provided to an account associated with a third organization that has used a third node to provide the additional new credit data to the set of distributed data sources. In some implementations, while performing the group of actions, the first node may provide the additional new credit data to the set of distributed data sources. Additionally, providing the additional new credit data to the set of distributed data sources may permit other organizations to use the network of nodes to obtain the additional new credit data in exchange for a particular amount of the digital currency.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a call flow diagram of an example call flow 600 for sharing credit data of an individual among a network of nodes that have access to a distributed ledger, a smart contract associated with the individual, and a distributed file system. In some implementations, one or more process blocks of FIG. 6 may be performed by a device, such as a first node (e.g., node 210). In some implementations, one or more process blocks of FIG. 6 may be performed by another device or a group of devices separate from or including the first node, such as another node, a distributed data source (e.g., distributed data source 220), a ledger management platform (e.g., ledger management platform 230), and/or a user device (e.g., user device 250).

As shown in FIG. 6, process 600 may include receiving new credit data of an individual that has credit with a first organization, wherein a blockchain and a set of distributed data sources are to be used to share the new credit data with a network of nodes that are associated with a group of organizations that are permitted to access the new credit data (block 610). For example, the first node (e.g., using processor 320, input component 350, communication interface 370, etc.) may receive new credit data of an individual that has credit with a first organization, as described above with regard to FIGS. 1A-1G. In some implementations, a blockchain and a set of distributed data sources may be used to share the new credit data with a network of nodes that are associated with a group of organizations that are permitted to access the new credit data.

As shown in FIG. 6, process 600 may include providing a storage identifier for the new credit data to a smart contract associated with the individual, wherein the smart contract is supported by the blockchain, and wherein the storage identifier is used to identify a storage location at which the new credit data is to be stored within the set of distributed data sources (block 620). For example, the first node (e.g., using processor 320, output component 360, communication interface 370, etc.) may provide a storage identifier for the new credit data to a smart contract associated with the individual, as described above with regard to FIGS. 1A-1G. In some implementations, the smart contract may be supported by the blockchain. In some implementations, the storage identifier may be used to identify a storage location at which the new credit data is to be stored within the set of distributed data sources.

As shown in FIG. 6, process 600 may include providing the new credit data and the storage identifier to the set of distributed data sources (block 630). For example, the first node (e.g., using processor 320, output component 360, communication interface 370, etc.) may provide the new credit data and the storage identifier to the set of distributed data sources, as described above with regard to FIGS. 1A-1G. In some implementations, the new credit data may be stored in association with the storage identifier.

As shown in FIG. 6, process 600 may include broadcasting the storage identifier for the new credit data to the network of nodes to cause a particular node, of the network of nodes, to add the storage identifier for the new credit data to a copy of the smart contract that is accessible to the particular node, wherein broadcasting the storage identifier permits the particular node to, based on a request for the new credit data by a second organization, obtain the storage identifier for the new credit data from the copy of the smart contract, use the storage identifier to obtain the new credit data from the set of distributed data sources, provide the new credit data to an interface associated with the second organization, and provide digital currency associated with the second organization to an account associated with the first organization (block 640). For example, the first node (e.g., using processor 320, output component 360, communication interface 370, etc.) may broadcast the storage identifier for the new credit data to the network of nodes to cause a particular node, of the network of nodes, to add the storage identifier for the new credit data to a copy of the smart contract that is accessible to the particular node, as described above with regard to FIGS. 1A-1G.

In some implementations, broadcasting the storage identifier may permit the particular node to, based on a request for the new credit data by a second organization, obtain the storage identifier for the new credit data from the copy of the smart contract, use the storage identifier to obtain the new credit data from the set of distributed data sources, provide the new credit data to an interface associated with the second organization, and provide digital currency associated with the second organization to an account associated with the first organization.

As shown in FIG. 6, process 600 may include performing a group of actions associated with obtaining additional new credit data from the set of distributed data sources and/or providing the additional new credit data to the set of distributed data sources (block 650). For example, the first node (e.g., using processor 320, memory 330, storage component 340, input component 350, output component 360, communication interface 370, etc.) may perform a group of actions associated with obtaining additional new credit data from the set of distributed data sources and/or providing the additional new credit data to the set of distributed data sources, as described above with regard to FIGS. 1A-1G.

Process 600 may include additional implementations, such as any single implementation or any combination of implementations described below and/or in connection with one or more other processes described elsewhere herein.

In some implementations, the first organization may only be permitted to use the network of nodes to access the new credit data if an organization identifier for the first organization is stored by a data structure associated with the smart contract. Additionally, the organization identifier for the first organization may be added to the data structure only after a particular amount of the digital currency associated with the first organization is provided to an account associated with the individual.

In some implementations, the first node may generate, after receiving the new credit data, the storage identifier for the new credit data by using a content addressing technique to generate a cryptographic hash value identifying the storage location at which the new credit data is to be stored within the set of distributed data sources. Additionally, the cryptographic hash value may be used as the storage identifier for the new credit data. In some implementations, the smart contract may be used exclusively for the individual.

In some implementations, while performing the group of actions, the first node may obtain the additional new credit data from the set of distributed data sources to cause a particular amount of the digital currency to be provided to an account associated with a third organization that has added the additional new credit data to the set of distributed data sources. In some implementations, while performing the group of actions, the first node may provide the additional new credit data to the set of distributed data sources to cause nodes associated with other organizations to obtain the additional new credit data in exchange for a particular amount of the digital currency.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the first node is able to facilitate the distribution of the credit data in a manner that is secure, distributed, automated, and incentive-driven.

For example, security is provided by supporting the distributed ledger with a tamper-resistant data structure (e.g., the blockchain), by implementing various forms of authentication, by restricting access to the network of nodes to particular organizations or parties, and/or the like. To provide a few particular examples, the distributed ledger may improve security by preserving an immutable record of the credit data, by using cryptographic links between blocks of the distributed ledger (e.g., reducing the potential for unauthorized tampering with the credit data), and/or the like. Security is further improved as a result of nodes that have access to the distributed ledger independently verifying each transaction that is added to the distributed ledger. Moreover, use of a distributed ledger also provides failover protection, in that the first node may continue to operate in a situation where one or more other nodes that have access to the distributed ledger fail.

Furthermore, by incentivizing organizations to update the distributed file system with new credit data, the credit data may serve as a reliable indicator of credit worthiness of the individual. Still further, the first node conserves processing resources and/or network resources and/or memory resources. For example, the first node conserves processing resources and/or network resources that might otherwise be used to query a set of credit bureau data sources to obtain credit data of the individual. As another example, by utilizing a distributed file system to store the credit data, the network of nodes improves in scalability, and conserves memory resources that might otherwise be used to attempt to store the credit data on the blockchain.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a first node, new credit data associated with an individual that has credit with a first organization,
        wherein a blockchain and a set of distributed data sources are to be used to share the new credit data with a network of nodes that are associated with a group of organizations that is permitted to access the new credit data, and
        wherein the new credit data has been provided to the set of distributed data sources by a second node associated with a second organization of the group of organizations;
    updating, by the first node, a smart contract associated with the individual to include information associated with the new credit data; and
    performing, by the first node, a group of actions associated with obtaining additional new credit data from the set of distributed data sources or providing the additional new credit data to the set of distributed data sources.

2. The method of claim 1, further comprising:
    receiving, from a device associated with the first organization, a request for the new credit data;
    obtaining, by the first node, the information associated with the new credit data from the smart contract;
    obtaining, by the first node, the new credit data by using a storage identifier to search the set of distributed data sources; and
    providing, by the first node, the new credit data to the device associated with the first organization.

3. The method of claim 2, wherein obtaining the storage identifier from the smart contract causes the smart contract to provide digital currency associated with the first organization to an account associated with the second organization.

4. The method of claim 1, wherein the first organization is only permitted to use the network of nodes to access the new credit data if an organization identifier for the first organization is stored by a data structure associated with the smart contract, and
    wherein the organization identifier for the first organization is added to the data structure only after a particular amount of digital currency associated with the first organization is provided to an account associated with the individual.

5. The method of claim 1, further comprising:
    generating, after receiving the new credit data, a storage identifier for the new credit data by using a content addressing technique to generate a cryptographic hash value identifying a storage location at which the new credit data is to be stored within the set of distributed data sources,
        wherein the cryptographic hash value is to be used as the storage identifier for the new credit data.

6. The method of claim 1, wherein the smart contract is used exclusively for the individual and includes at least one of:
- data identifying the group of organizations that are permitted to access the new credit data,
- a set of storage identifiers identifying a set of storage locations associated with historical credit data of the individual,
- a first function associated with providing the new credit data to the set of distributed data sources, or
- a second function associated with obtaining the new credit data from the set of distributed data sources,
    - wherein the second function requires that a particular amount of digital currency be provided to obtain the new credit data.

7. The method of claim 1, wherein the first organization and the second organization are lending organizations.

8. A first node, comprising:
one or more memories; and
one or more processors communicatively coupled to the one or more memories, configured to:
- receive new credit data associated with an individual that has credit with a first organization,
    - wherein a blockchain and a set of distributed data sources are to be used to share the new credit data with a network of nodes that are associated with a group of organizations that is permitted to access the new credit data;
- provide a storage identifier for the new credit data to a smart contract associated with the individual,
    - wherein the smart contract is supported by the blockchain, and
    - wherein the storage identifier is used to identify a storage location at which the new credit data is to be stored within the set of distributed data sources; and
- perform a group of actions associated with obtaining additional new credit data from the set of distributed data sources or providing the additional new credit data to the set of distributed data sources.

9. The first node of claim 8, wherein the one or more processors are further configured to:
- generate, using a content addressing technique, a cryptographic hash value identifying the storage location at which the new credit data is to be stored within the set of distributed data sources,
    - wherein the cryptographic hash value is to be used as the storage identifier for the new credit data.

10. The first node of claim 9, wherein the one or more processors, when performing the group of actions, are to:
- provide the additional new credit data to the set of distributed data sources to cause nodes associated with other organizations to obtain the additional new credit data in exchange for a particular amount of digital currency.

11. The first node of claim 8, wherein the first organization is only permitted to use the network of nodes to access the new credit data if an organization identifier for the first organization is stored by a data structure associated with the smart contract, and
    - wherein the organization identifier for the first organization is added to the data structure only after a particular amount of digital currency associated with the first organization is provided to an account associated with the individual.

12. The first node of claim 8, wherein the one or more processors, when performing the group of actions, are to:
- obtain the additional new credit data from the set of distributed data sources,
    - wherein another node in the network of nodes provided the additional new credit data to the set of distributed data sources,
    - wherein the other node is associated with a particular organization, and
    - wherein obtaining the additional new credit data causes digital currency to be provided to an account associated with the particular organization.

13. The first node of claim 8, wherein the smart contract is used exclusively for the individual, and includes at least one of:
- data identifying the group of organizations that are permitted to access the new credit data,
- a set of storage identifiers identifying a set of storage locations associated with historical credit data of the individual,
- a first function associated with providing the new credit data to the set of distributed data sources, or
- a second function associated with obtaining the new credit data from the set of distributed data sources,
    - wherein the second function requires that a particular amount of digital currency be provided to obtain the new credit data.

14. The first node of claim 8, wherein the one or more processors are further to:
- broadcast the storage identifier for the new credit data to the network of nodes to cause a second node, of the network of nodes, to provide the storage identifier for the new credit data to a copy of the smart contract that is accessible to the second node,
    - wherein broadcasting the storage identifier permits, based on a request from a device associated with a second organization, the second node to obtain the new credit data, obtain the storage identifier for the new credit data from the copy of the smart contract, use the storage identifier to obtain the new credit data from the set of distributed data sources, provide the new credit data to the device associated with the second organization, and provide digital currency associated with the second organization to an account associated with the first organization.

15. A non-transitory computer-readable medium storing instructions, the instructions comprising:
one or more instructions that, when executed by one or more processors, cause the one or more processors of a first node to:
- receive new credit data associated with an individual that has credit with a first organization,
    - wherein a blockchain and a set of distributed data sources are to be used to share the new credit data with a network of nodes that are associated with a group of organizations that is permitted to access the new credit data;
- provide a storage identifier for the new credit data to a smart contract associated with the individual;
- broadcast the storage identifier for the new credit data to the network of nodes to cause a second node, of the network of nodes, to provide the storage identifier for the new credit data to a copy of the smart contract that is accessible to the second node; and
- perform a group of actions associated with obtaining additional new credit data from the set of distributed data sources or providing the additional new credit data to the set of distributed data sources.

16. The non-transitory computer-readable medium of claim 15, wherein the one or more instructions, when executed by the one or more processors, further cause the one or more processors to:
receive, from a device associated with the first organization, a request for the new credit data;
obtain information associated with the new credit data from the smart contract;
obtain the new credit data by using the storage identifier to search the set of distributed data sources; and
provide the new credit data to the device associated with the first organization.

17. The non-transitory computer-readable medium of claim 16, wherein broadcasting the storage identifier permits, based on a request from a device associated with a second organization, the second node to obtain the new credit data, obtain the storage identifier for the new credit data from the copy of the smart contract, use the storage identifier to obtain the new credit data from the set of distributed data sources, provide the new credit data to the device associated with the second organization, and provide digital currency associated with the second organization to an account associated with the first organization.

18. The non-transitory computer-readable medium of claim 15, wherein the first organization is only permitted to use the network of nodes to access the new credit data if an organization identifier for the first organization is stored by a data structure associated with the smart contract; and
wherein the organization identifier for the first organization is added to the data structure only after a particular amount of digital currency associated with the first organization is provided to an account associated with the individual.

19. The non-transitory computer-readable medium of claim 15, wherein the new credit data received from the set of distributed data sources has been encrypted using a first key associated with the individual; and
wherein the one or more instructions, when executed by the one or more processors, further cause the one or more processors to:
decrypt the new credit data using a second key associated with the individual;
encrypt the new credit data using a first key associated with the first organization; and
provide the new credit data to a device associated with the first organization,
wherein the new credit data that has been encrypted using the first key associated with the first organization to permit the device associated with the first organization to decrypt the new credit data using a second key associated with the first organization.

20. The non-transitory computer-readable medium of claim 15, wherein the smart contract is used exclusively for the individual, and includes at least one of:
data identifying the group of organizations that are permitted to access the new credit data,
a set of storage identifiers identifying a set of storage locations associated with historical credit data of the individual,
a first function associated with providing the new credit data to the set of distributed data sources, or
a second function associated with obtaining the new credit data from the set of distributed data sources,
wherein the second function requires that a particular amount of digital currency be provided to obtain the new credit data.

* * * * *